US012021342B2

(12) United States Patent
O'Neil (10) Patent No.: US 12,021,342 B2
(45) Date of Patent: Jun. 25, 2024

(54) ELECTRICAL BUSBAR WITH ALIGNMENT FEATURES

(71) Applicant: Rivian IP Holdings, LLC, Irvine, CA (US)

(72) Inventor: Kyle O'Neil, Los Angeles, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

(21) Appl. No.: 17/713,443

(22) Filed: Apr. 5, 2022

(65) Prior Publication Data

US 2022/0247041 A1 Aug. 4, 2022

Related U.S. Application Data

(63) Continuation of application No. 16/683,114, filed on Nov. 13, 2019, now Pat. No. 11,322,803.

(Continued)

(51) Int. Cl.
*H01R 4/58* (2006.01)
*H01M 50/50* (2021.01)
(Continued)

(52) U.S. Cl.
CPC ............. *H01R 4/58* (2013.01); *H01M 50/50* (2021.01); *H01M 50/503* (2021.01); *H01R 43/00* (2013.01); *H01M 2220/20* (2013.01)

(58) Field of Classification Search
CPC ...................................................... H01M 2/20
(Continued)

(56) References Cited

U.S. PATENT DOCUMENTS 6,280,263 B1 * 8/2001 Manor .................. H01R 11/26
439/813
6,305,991 B1 10/2001 Gerster
(Continued)

FOREIGN PATENT DOCUMENTS

CN 1971975 A 5/2007
CN 101316009 A 12/2008
(Continued)

OTHER PUBLICATIONS

International Search Report and Written Opinion of PCT/US2019/061312 dated Feb. 20, 2020.

*Primary Examiner* — Stanley Tso
(74) *Attorney, Agent, or Firm* — HALEY GUILIANO LLP

(57) ABSTRACT

A busbar system is configured to carry current, such as, for example, in a battery system. The busbar system includes two or more busbars, that interface at respective surfaces and are aligned by one or more alignment features. The one or more alignment features may include a boss feature such as a pin or other protrusion, a recess such as a hole, slot, or other recess feature, or both a boss feature and a recess feature. Each busbar may include an alignment feature that engages with the alignment feature of the other busbar to cause, maintain, or otherwise effect alignment. Alignment of the busbars ensures relative position, prevents relative motion, or both. The busbars are engaged with each other by positioning the busbars such that their mating surfaces can engage, and then engaging alignment features of the busbars to provide alignment of the busbars relative to each other.

18 Claims, 5 Drawing Sheets

(A)

(B)

(C)

(D)

(E)

Related U.S. Application Data (60) Provisional application No. 62/760,869, filed on Nov. 13, 2018.

(51) Int. Cl.
  *H01M 50/503* (2021.01)
  *H01R 43/00* (2006.01)

(58) Field of Classification Search
  USPC ........................................... 174/133 B
  See application file for complete search history.

(56) References Cited

U.S. PATENT DOCUMENTS

| | | | |
|---|---|---|---|
| 7,759,577 | B1 | 7/2010 | Morales |
| 11,322,803 | B2 * | 5/2022 | O'Neil .................... H01R 4/58 |
| 2007/0026739 | A1 | 2/2007 | Kim et al. |
| 2007/0207638 | A1 * | 9/2007 | Wiant .................. H01R 25/162 |
| | | | 439/76.2 |
| 2013/0244508 | A1 * | 9/2013 | Taguchi ............... H01R 13/113 |
| | | | 439/833 |
| 2015/0270666 | A1 | 9/2015 | Callicoat et al. |
| 2016/0308187 | A1 | 10/2016 | Subramanian et al. |
| 2017/0317429 | A1 | 11/2017 | Roan et al. |

FOREIGN PATENT DOCUMENTS

| | | |
|---|---|---|
| CN | 104335689 A | 2/2015 |
| CN | 104862743 A | 8/2015 |
| CN | 104966807 A | 10/2015 |
| CN | 106058128 A | 10/2016 |
| CN | 107342465 A | 11/2017 |
| CN | 107528133 A | 12/2017 |
| EP | 1014494 A1 | 6/2000 |
| EP | 1087300 A2 | 3/2001 |
| EP | 1 750 313 | 2/2007 |
| EP | 3 240 112 | 11/2017 |
| WO | WO 2017209428 | 12/2017 |
| WO | WO 2019145264 | 8/2019 |

* cited by examiner

ELECTRICAL BUSBAR WITH ALIGNMENT FEATURES

CROSS REFERENCE TO RELATED APPLICATION

This application is a continuation of U.S. patent application Ser. No. 16/683,114 filed on Nov. 13, 2019, which claims the benefit of U.S. Provisional Patent Application No. 62/760,869 filed Nov. 13, 2018, the disclosures of which are hereby incorporated by reference herein in their entireties.

The present disclosure is directed towards an electrical busbar for conducting current, and more particularly towards an electrical busbar having alignment features.

INTRODUCTION

Electrical busbars are used to provide a path for current among components. For example, battery systems use busbars to connect cells in parallel and/or series, couple cells to components such as switches, connectors, or fuses. Two or more busbars can be connected together to further extend the current path. It would be advantageous to provide for alignment of busbars to prevent a change in relative position, relative orientation, or both.

Busbar alignment can be achieved with an assembly aid (e.g., a jig) that constrains one or both of the busbars so they cannot move relatively to each other while being secured. However, the additional cost and mass (e.g., if it is a permanent part of the assembly) might not be acceptable.

SUMMARY

The present disclosure is direct to a busbar system. The busbar system includes a first busbar and a second busbar. The first busbar includes a first surface and at least one boss feature extending from the first surface. The second busbar includes a second surface that is configured to contact the first surface and at least one recess feature in the second surface. The at least one boss feature is configured to engage with the at least one recess feature to limit motion of the first busbar relative to the second busbar. For example, each of the first busbar and the second busbar are configured to carry electrical current and allow electrical current to flow from either busbar to the other busbar.

In some embodiments, the at least one boss feature includes a pin. For example, in some embodiments, the pin includes a cylindrical pin, a pin having a circular cross section, a pin having a diamond-shaped cross section, a pin having any other suitable cross section, or any combination thereof. In some embodiments, the at least one boss feature includes a friction drilled feature. In some embodiments, the at least one boss feature includes a pressed feature.

In some embodiments, the at least one recess feature includes a hole. For example, in some embodiments, the at least one recess feature includes a circular hole, a non-circular hole, any other suitably shaped hole, or any combination thereof. In some embodiments, the at least one recess feature includes a slot. For example, in some embodiments, the at least one recess feature includes a rectangular slot, a slot with rounded ends, a curved slot, any other suitably shaped slot, or any combination thereof. In some embodiments, the at least one recess feature includes a punched feature, a pressed feature, or both.

In some embodiments, the first busbar includes a first through-hole, the second busbar further includes a second through-hole, and when the at least one boss feature is engaged with the at least one recess feature, the first through-hole is aligned with the second through-hole. For example, in some embodiments, a fastener is configured to extend though the aligned first through-hole and second through-hole and apply a clamping force to press the first busbar and the second busbar together.

In some embodiments, the at least one boss feature includes more than one boss feature. For example, in some embodiments, the at least one boss feature includes two boss features. In a further example, the two boss features may have substantially the same shape. In a further example, the two boss features may have substantially different shapes. In some embodiments, the at least one recess feature includes more than one recess feature. For example, in some embodiments, the at least one recess feature includes two recess features. In a further example, the two recess features may have substantially the same shape. In a further example, the two recess features may have substantially different shapes.

In some embodiments, the first busbar includes at least one second recess feature in the first surface, the second busbar includes at least one second boss feature in the second surface, and the at least one second boss feature is configured to engage with the at least one second recess feature to prevent motion of the first busbar relative to the second busbar.

In some embodiments, the present disclosure is directed to a method for assembling a busbar system. The method includes positioning a first busbar and a second busbar. The first busbar includes a first surface and at least one boss feature on the first surface. The second busbar includes a second surface and at least one recess feature on the second surface. The method also includes engaging the at least one boss feature with the at least one recess feature to prevent relative motion of the first busbar and the second busbar. In some embodiments, the method includes pressing the first busbar and the second busbar together so that the first surface and the second surface are in contact with each other.

In some embodiments, the first surface and the second surface are in contact with each other at an interface, and the method includes affixing the first busbar to the second busbar. Affixing is achieved by welding the interface, brazing the interface, soldering the interface, pressing the interface, fastening the interface, crimping the interface, deforming the interface, or a combination thereof.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Figure 1:
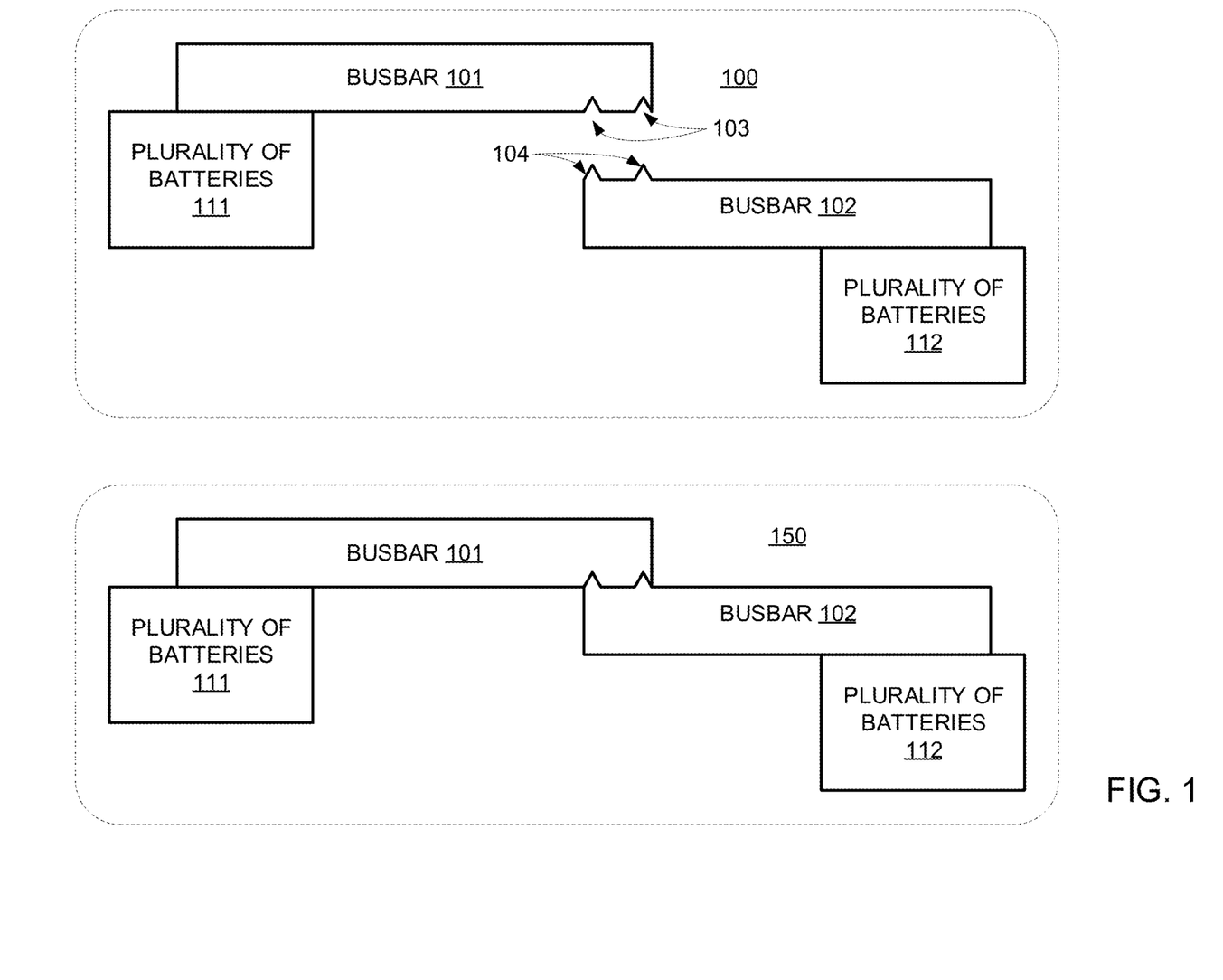
FIG. 1 shows two configurations of an illustrative busbar system, in accordance with some embodiments of the present disclosure.

FIG. 1 shows two configurations 100 and 150 of an illustrative busbar system, in accordance with some embodiments of the present disclosure. The busbar system includes busbar 101 and busbar 102, which are each configured to engage with a respectively plurality of battery cells and provide a conduit for current. The respective pluralities of battery cells may be arranged spatially, and each of busbar 101 and busbar 102 may include features that engage with each respective battery cell to provide electrical contact. For example, busbar 101 and busbar 102 may each provide a path for current to flow in parallel from the respective plurality of battery cells. Busbar 101 and busbar 102 are electrically coupled together. For example, as illustrated, busbar 101 and busbar 102 are fastened together. Alignment features 103 of busbar 101 and alignment features 104 of busbar 102 help maintain alignment during arrangement of busbars 101 and 102, during fastening of busbars 101 and 102 together, during fastening of busbars 101 and 102 to the respective plurality of battery cells, during operation (e.g., in an electric vehicle that undergoes acceleration), or any combination thereof. Alignment features 103 and 104 may include any suitable recess features, boss features, or both, that constrain at least some motion or displacement of busbars 101 and 102 relative to each other. As illustrated, alignment features 103 and 104 include tapered recess features (e.g., tapered blind holes) and tapered boss features (e.g., tapered pins), respectively.

As illustrated, busbars 101 and 102 are electrically coupled to respective pluralities of batteries 111 and 112. In configuration 100, busbar 101 and busbar 102 are not electrically coupled, which corresponds to, for example, a configuration during assembly, during alignment, during manufacture, or any other time when busbar 101 and busbar 102 need not be aligned, fastened, electrically coupled, or a combination thereof. In configuration 150, busbar 101 and busbar 102 are electrically coupled, which corresponds to, for example, a configuration during operation, during testing, or any other time when busbar 101 and busbar 102 need be aligned, fastened, electrically coupled, or a combination thereof. For example, configuration 150 may include one or more fasteners that affix busbars 101 and 102 to each other (e.g., bolts, screws, threaded nuts, lock nuts, crimpable features, press-fit features)

The present disclosure is directed to busbars having one or more alignment features (or "features") that engage for alignment. In some embodiments, alignment features include boss features that extend from a surface and are continuous with the bulk busbar (e.g., formed from a busbar blank and accordingly of the same material). One or more features may be included to constrain relative motion between the coupled busbars. For example, engaging features of a first and second busbar may include a boss feature and a recess feature. In a further example, because the boss feature is made of the base material, there will not be an interruption in current flow when the coupled busbars are in use. Busbars are made of electrically conducting material such as, for example, copper, aluminum, any other suitable metal, alloy, or material that has a desired electrical conductivity, or any combination thereof.

In some embodiments, the alignment features provide alignment to aid the joining of busbars. For example, the alignment features may keep the busbars secured during fastening, welding (e.g., laser welding, ultrasonic welding), soldering, brazing, pressing, any other suitable joining techniques, or any combination thereof.

In an illustrative example, a first busbar may include a pin and a second busbar may include a blind hole. The pin may be sized for a press-fit operation with the hole such that no other parts (e.g., fasteners) are required. In a further example, a busbar may include several pins, or other suitable boss features, configured to engage with corresponding recess features. Boss features may include, for example, pins (e.g., round pins, diamond pins, oval pins, triangular pins, or any other suitable pin type), hemispherical bumps, ridges, tabs, an extension having any suitable uniform cross-section, an extension having any suitable non-uniform cross-section (e.g., a cone, a pyramid), any other suitable feature extending from a busbar surface, or any combination thereof. Recess features may include, for example, holes (e.g., round holes), hemispherical indentations, slots, grooves, a recess having any suitable uniform cross-section, a recess having any suitable non-uniform cross-section, any other suitable relief in a busbar surface, or any combination thereof.

A boss feature is configured to engage with one or more recess features (e.g., a round pin is configured to engage with a round hole or a slot). A recess feature is configured to engage with one or more boss features (e.g., a round hole may accommodate a round pin or a diamond pin). In some embodiments, a busbar may include more than one alignment feature. For example, a first busbar may include two boss features configured to engage with two respective recess features of a second busbar. In a further example, a busbar may include a boss feature and a recess feature configured to engage with a respective second recess feature and a second boss feature of a second busbar. In a further example, a busbar may include two boss features that are the same as each other (e.g., two round pins of similar size, or two tabs of similar size and shape) or are different from each other (e.g., a round pin and a diamond pin, or round pins of differing sizes). In a further example, a busbar may include two recess features that are the same as each other (e.g., two round holes of similar diameter, or two slots of similar size) or are different from each other (e.g., a round hole and a slot, or round holes of differing sizes).

An alignment feature may be formed in a busbar using any suitable technique, process, and equipment. For example, a boss feature such as a pin may be formed in a busbar by friction drilling from one side with a mold of the desired pin on the other side. In some such examples, the drill bit need not pierce the busbar material completely, but rather may heat up the material locally and push it into the mold to form the pin. In a further example, a busbar may be stamped, pressed, machined, or otherwise processed to form a boss feature. A recess feature may be formed by drilling, machining, punching, pressing, melting, any other suitable process for forming a recess (e.g., by removing material or causing material to flow), or any combination thereof.

The use of alignment features allows busbars to be accurately aligned, which may improve manufacturing quality, creepage/clearance safety, and/or structural rigidity. In some embodiments, because the alignment features do not include a different material than the busbar material, the joint may be less susceptible to corrosion, increased local electrical resistance (e.g., interfacial resistance), and stress due to different coefficients of thermal expansion of different materials. For example, a pin-like alignment feature made from the base material of the busbar helps eliminate these issues.

In some embodiments, alignment features allow for tighter tolerances than fasteners alone. In some embodiments, alignment features prevent relative motion of busbars coupled by a fastener (e.g., relative motion caused by applied torque, normal forces, and/or friction forces acting on the bus bars during fastening).

In some embodiments, a busbar may include a particular boss feature or recess feature that is configured to engage only some other alignment features of other busbars. For example, there may be several types of busbars, and only some combinations may be coupled together. In an illustrative example, boss features for larger current capacity busbars may be arranged (e.g., located) differently based on current capacity, to prevent mismatched busbars. In some embodiments, alignment features may be keyed or otherwise shaped to only engage with a subset of other alignment features. For example, for a plurality of busbar types, only certain types may be coupled together, based on the engagement of the corresponding alignment features. In some embodiments, a recess feature may be configured to engage with two or more boss features. For example, a first busbar may include two pins configured to engage in a single slot of a second busbar to prevent relative motion of busbars.

Figure 2:
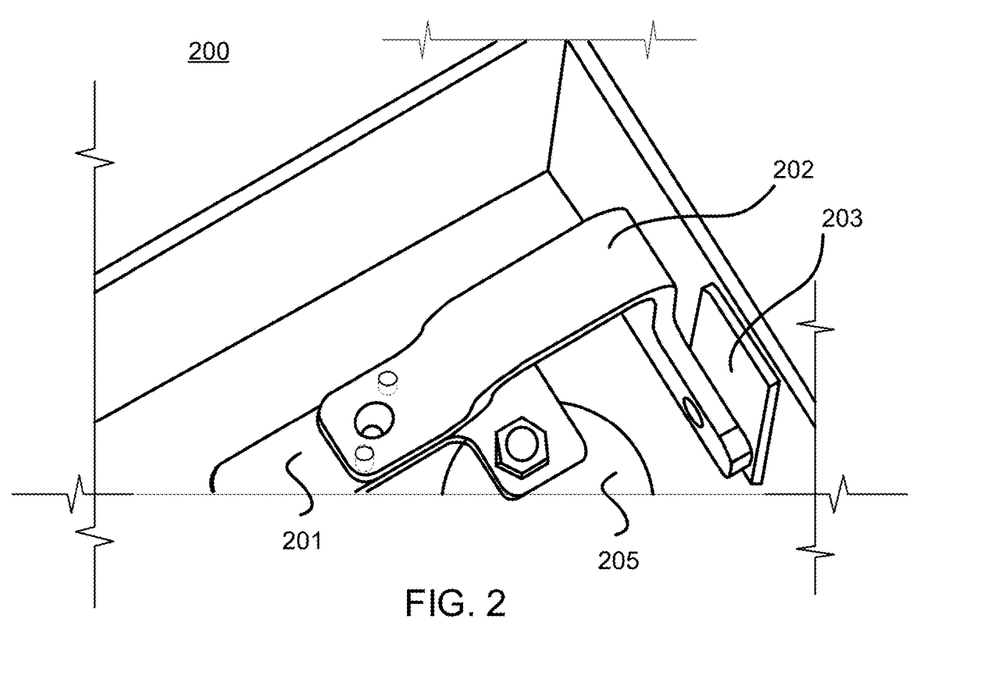
FIG. 2 shows a perspective view of a first busbar and a second busbar of an illustrative battery system, in accordance with some embodiments of the present disclosure.

FIG. 2 shows a perspective view of first busbar 201 and second busbar 202 of illustrative battery system 200, in accordance with some embodiments of the present disclosure. First and second busbars 201 and 202 are configured to be fastened together to provide a current-carrying path. As illustrated, second busbar 202 is electrically coupled to electrical terminal 203, which may include, for example, a DC bus connector, one or more electrical terminals, any other suitable electrical termination, or any combination thereof. As illustrated, first busbar 201 is electrically coupled to contactor 205 (e.g., fastened to contactor 205 as illustrated).

Figure 3A:
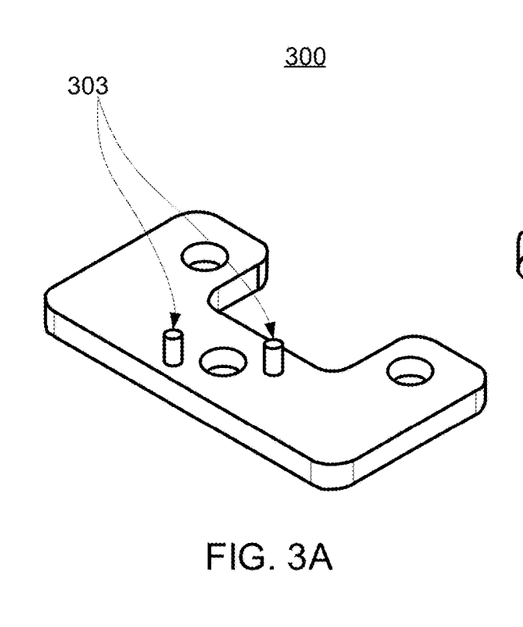
FIG. 3A shows a perspective view of a first busbar, having alignment features, in accordance with some embodiments of the present disclosure

FIG. 3A shows a perspective view of busbar 300, having alignment features, in accordance with some embodiments of the present disclosure. The busbar 300 includes two pins 303 of round cross-section (i.e., round pins). Accordingly, busbar 300 may be engaged with another busbar (e.g., busbar 350 of FIG. 3B or any other suitable busbar) by inserting two pins 303 into corresponding holes of the other busbar.

Figure 3B:
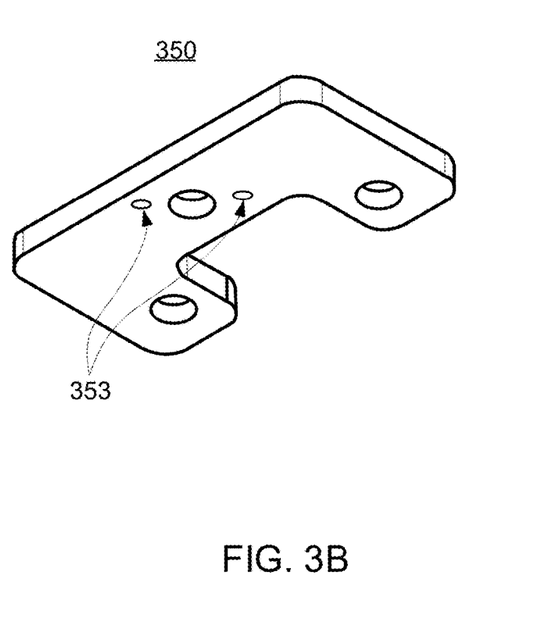
FIG. 3B shows a perspective view of a busbar, having recess alignment features, in accordance with some embodiments of the present disclosure.

FIG. 3B shows a perspective view of busbar 350, in accordance with some embodiments of the present disclosure. Busbar 350 includes recess features 353. Recess features 353, as illustrated, includes circular holes. For example, alignment features 353 of busbar 350 may be configured to engage with alignment features 303 of busbar 300 of FIG. 3A. Although busbars 300 and 350 shown in FIGS. 3A-3B include alignment features of circular cross-section (e.g., two round pins), busbars may include any suitable number of boss features, each having any suitable shape and size, in accordance with some embodiments of the present disclosure.

Figure 4:
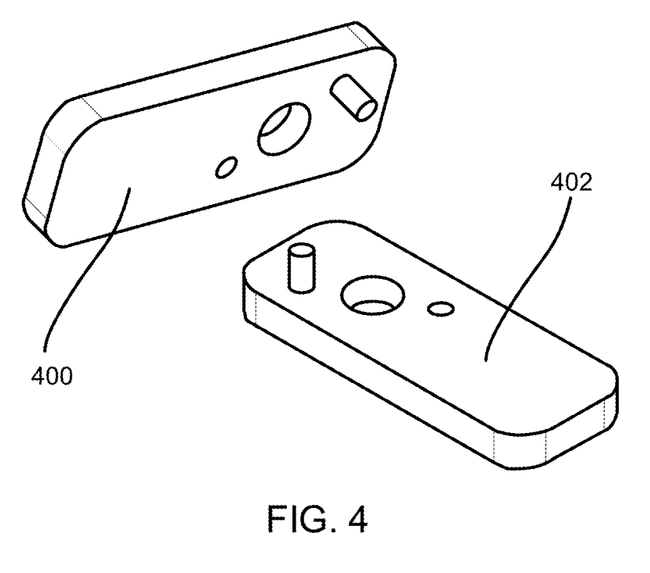
FIG. 4 shows a perspective view of two busbars, having the same alignment features, in accordance with some embodiments of the present disclosure.

FIG. 4 shows a perspective view of two busbars 400 and 402, having the same alignment features, in accordance with some embodiments of the present disclosure. Busbars 400 and 402 each include a pin of round cross-section (i.e., a round pin) and a recess feature (e.g., a circular hole as illustrated). In some embodiments, busbars 400 and 400 are identical parts. This enables a single part to be used twice to make a connection. As illustrated, a through-hole is centered between the pin and recess features of busbars 400 and 402, which causes the through-holes to be aligned when the pin and recess features of the busbars are engaged. A fastener can then be inserted into the aligned through-holes. The pin and recess features are aligned 45 degrees relative to the longitudinal axis of the busbars. Such an alignment causes the busbars to be aligned at 90 degrees when engaged. This alignment is merely illustrative and any suitable angle of alignment may be used to achieve a desire alignment between the busbars.

In an illustrative example, busbars 300 and 350 of FIGS. 3A-3B may be configured to be fastened together to provide a current-carrying path (e.g., after alignment by engaging alignment features). In another illustrative example, busbars 400 and 402 of FIG. 4 may be configured to be fastened together to provide a current-carrying path (e.g., after alignment by engaging alignment features). When the pins are engaged with the respective holes, the application of torque to a fastener is prevented from rotating either of the busbars relative to each other. In some circumstances, engagement of the pins and holes maintains alignment during fastening, welding (e.g., laser welding, ultrasonic welding), soldering, brazing, pressing, crimping, any other suitable joining techniques, or any combination thereof.

Figure 5:
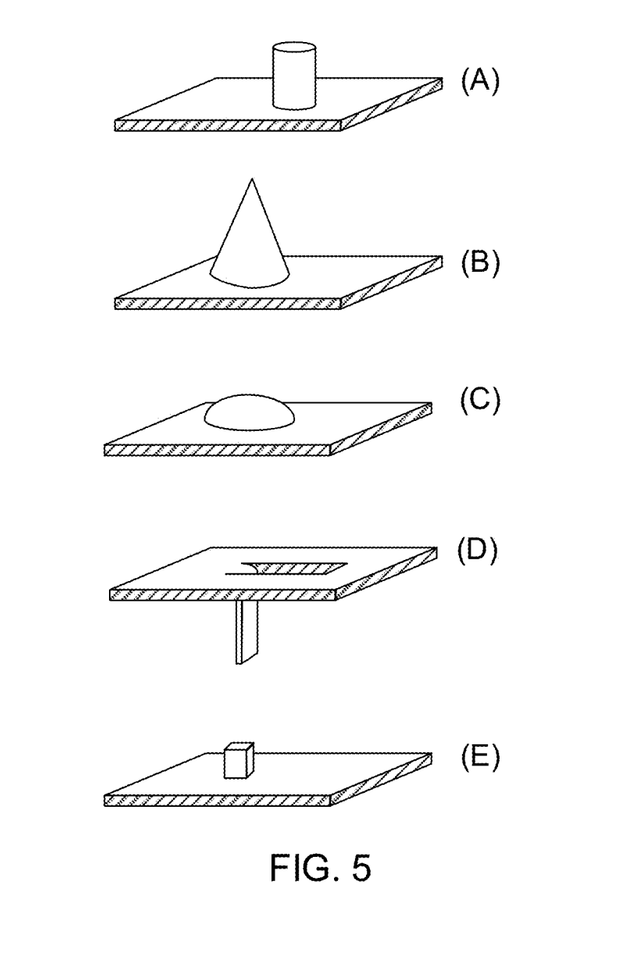
FIG. 5 shows perspective views of portions of busbars having illustrative boss features, in accordance with some embodiments of the present disclosure.

FIG. 5 shows perspective views of portions of busbars having illustrative boss features, in accordance with some embodiments of the present disclosure. Panel A shows a cylindrical pin (e.g., formed by friction drilling or pressing the underside of the busbar with a cylindrical mold on the top side). Panel B shows a conical pin (e.g., formed by friction drilling or pressing the underside of the busbar with a conical mold on the top side). Panel C shows a hemispherical bump (e.g., formed by friction drilling or pressing the underside of the busbar with a hemispherical mold on the top side or no mold). Panel D shows a bent tab (e.g., formed by punching a three sided through-trace outlining a tab and then bending the tab down). Panel E shows a diamond pin (e.g., formed by pressing the underside of the busbar with a diamond mold on the top side).

Figure 6:
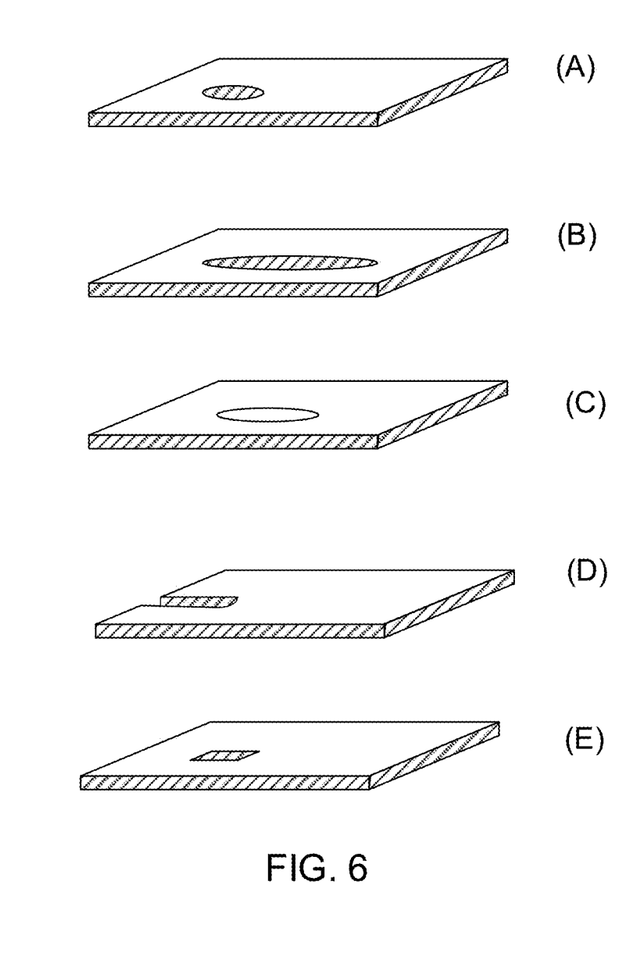
FIG. 6 shows perspective views of portions of busbars having illustrative recess features, in accordance with some embodiments of the present disclosure.

FIG. 6 shows perspective views of portions of busbars having illustrative recess features, in accordance with some embodiments of the present disclosure. Panel A shows a cylindrical through hole (e.g., formed by milling, laser cutting, water-jet cutting, plasma cutting, drilling or punching the busbar with a die from either side). Panel B shows a through slot (e.g., formed by milling, laser cutting, water-jet cutting, plasma cutting, or punching). Panel C shows a hemispherical indentation (e.g., formed by friction drilling or pressing the top side of the busbar). Panel D shows a notch (e.g., formed by milling, laser cutting, water-jet cutting, plasma cutting, or punching). Panel E shows a non-circular hole (e.g., formed by milling, laser cutting, water-jet cutting, plasma cutting, or punching), which may be, but need not be, polygonal. The boss features illustrated in FIG. 5, and any other suitable boss features, may be configured (e.g., located, sized, and shaped suitably) to engage with the recess features illustrated in FIG. 5, or any other suitable recess features. For example, any or all of the pin of FIG. 5, panel A, the conical pin of FIG. 5, panel B, the bump of FIG. 5, panel C, the bent tab of FIG. 5, panel D, and the boss feature of FIG. 5, panel E, may be configured to engage with a hole (e.g., shown in FIG. 6, panel A), a slot (e.g., shown in FIG. 6, panel B), an indentation (e.g., shown in FIG. 6, panel C), a notch (e.g., shown in FIG. 6, panel D), a pin having polygonal cross-section (e.g., shown in FIG. 6, panel E) any other suitable recess feature. For example, other suitable recess features may include tapered holes, punched holes (e.g., of any cross-sectional shape), any other through features, or any combination thereof.

In an illustrative example, the busbars having align features of the present disclosure may be included as part of a battery system. For example, busbars may be included in battery systems, and may be configured to carry over an amp of current, over ten amps, or even over a hundred amps of current. In a further example, the busbars of the present disclosure may be included in relative high-voltage systems such as system operating at over 100V, over 200V, over 400V, or at a greater voltage. To illustrate, the battery system may be included in an electric vehicle (e.g., may provide a DC bus to power electric motors of the vehicle). In some embodiments, a busbar may include a relatively simple geometric shape (e.g., a bar, a polygon, an "L" or "U" shape). In some embodiments, a busbar may include a relatively complex shape (e.g., comb-shaped, compound bends, multiple bends, bends in more than one plane, a plurality of connection points). In some embodiments, a busbar may be structurally rigid, having a cross-sectional area sufficient to carry an expected current load (e.g., which may be over ten amps, or over one hundred amps). For example, a busbar may be hundreds of microns thick, a millimeter thick, several millimeters thick, or even a centimeter thick (e.g., depending on the width to achieve a desired cross-sectional area). The alignment features of the present disclosure may be, but need not be, sized based on dimensions of the busbar.

Figure 7:
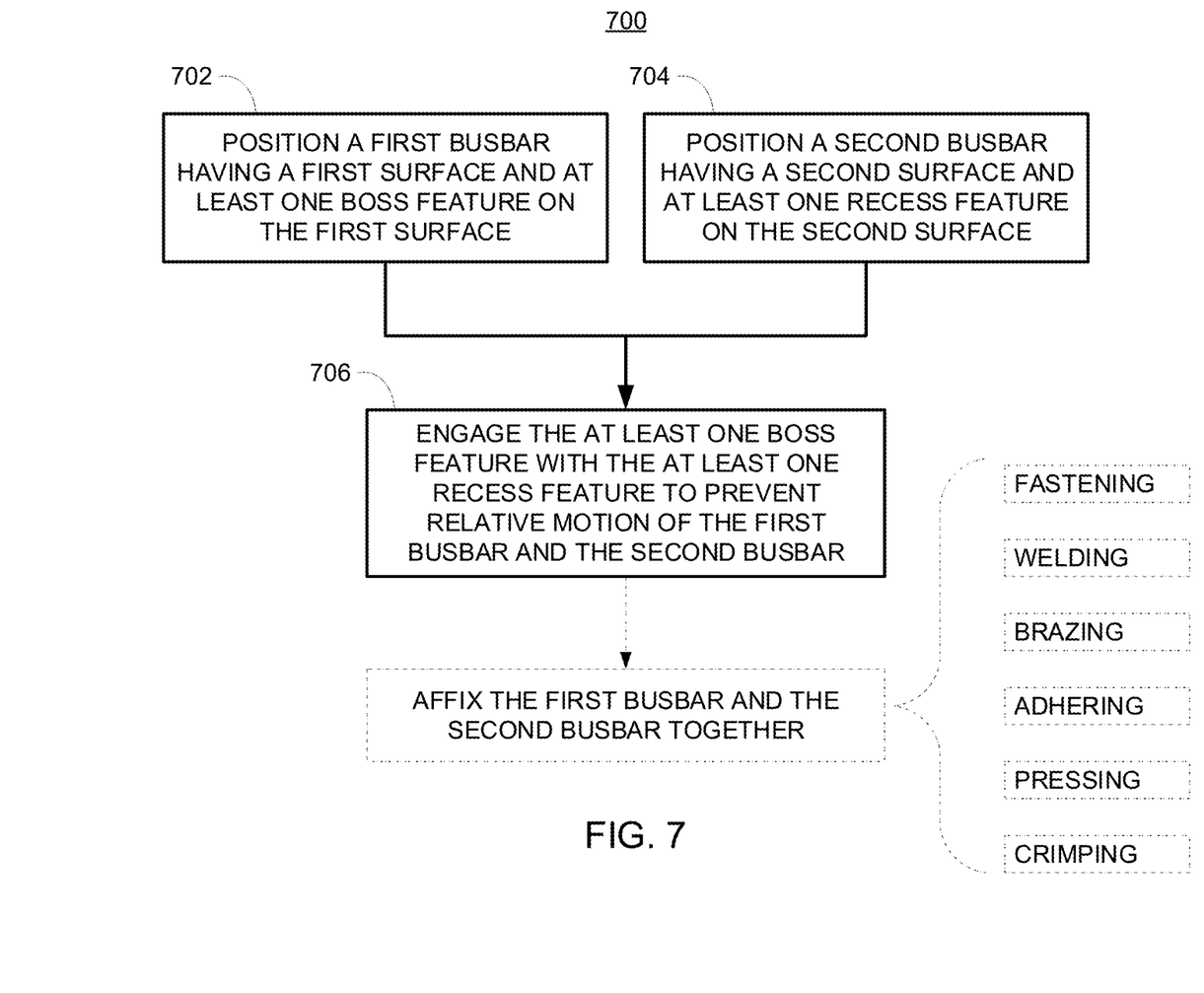
FIG. 7 shows a flowchart of an illustrative process for forming a busbar assembly, in accordance with some embodiments of the present disclosure.

FIG. 7 shows a flowchart of illustrative process 700 for forming a busbar assembly, in accordance with some embodiments of the present disclosure.

Step 702 includes positioning a first busbar. The first busbar has a first surface and at least one boss feature on the first surface. For example, any of the boss features of FIG. 5, any other suitable boss features, or any combination of boss features thereof, may be arranged on the surface. Positioning the first busbar may include setting a position (e.g., in three-dimensional space, or on a two-dimensional plane such as a work surface), an orientation, or both, relative to any suitable reference such as, for example, a tool, a work surface, a measurement device, a point in space, another busbar (e.g., the second busbar of step 704), or any other suitable reference or combination of references.

Step 704 includes positioning a second busbar. The second busbar has a second surface and at least one recess feature on the second surface. For example, any of the recess features of FIG. 6, any other suitable recess features, or any combination of recess features thereof, may be arranged on the surface. Positioning the second busbar may include setting a position (e.g., in three-dimensional space, or on a two-dimensional plane such as a work surface), an orientation, or both, relative to any suitable reference such as, for example, a tool, a work surface, a measurement device, a point in space, the first busbar, or any other suitable reference or combination of references. Steps 702 and 704 may be performed in any suitable order. For example, steps 702 and 704 may be performed simultaneously, or sequentially (e.g., with either step performed first).

Step 706 includes engaging the at least one boss feature with the at least one recess feature to prevent relative motion of the first busbar and the second busbar. The engagement may constrain one, more than one, or all degrees of freedom of the first and second busbars relative to each other. For example, engagement of the at least one boss feature and the at least one recess feature may prevent relative rotation and relative translation in a plane. In some embodiments, a friction weld or press machine is used to make at least one of the boss feature on the first busbar and the recess feature on the second busbar. In some embodiments, the same friction weld or press machine (e.g., the machine used to make the boss feature on the first busbar) is used to position the first busbar in step 702 or the second busbar in step 704 and assist in engaging the boss feature with the recess feature in step 706. In some embodiments, the same friction weld or press machine is used to position the first and second busbars in steps 702 and 704 and engage the boss feature with the recess feature in step 706. For example, the friction weld or press machine may include two movable grippers to position the busbars and engage the corresponding features. This can be achieved by programming or reprogramming the machine to perform multiple functions, which can decrease manufacturing costs.

In some embodiments, when the first and second busbars are aligned (e.g., alignment features are engaged with each other), they may be affixed to maintain their spatial configuration. For example, affixing may include fastening, welding, brazing, adhering, pressing, crimping, any other suitable technique for affixing first and second busbars, or any combination thereof. The affixing may be, but need not be, reversible (e.g., while fastening may be reversible, welding might not be reversible).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A busbar system comprising:
   a first busbar comprising a hole and a notch arranged on a first surface, wherein the notch is arranged along an outer edge of the first surface;
   a second busbar comprising a through-hole on a second surface and a bent tab; and
   a fastener that extends through the through-hole into the hole and applies a clamping force between the first surface and the second surface, wherein:
      when the hole and the through-hole are aligned and the first surface and the second surface are in direct electrical contact, the second surface extends along the first surface until the notch is reached where the second surface bends into the notch via the bent tab.

2. The busbar system of claim 1, wherein, when the bent tab extends into the notch, the bent tab prevents the first busbar from rotating relative to the second busbar.

3. The busbar system of claim 1, wherein the notch comprises a friction drilled feature.

4. The busbar system of claim 1, wherein the notch comprises a pressed feature.

5. The busbar system of claim 1, wherein the notch comprises a hole.

6. The busbar system of claim 1, wherein the notch comprises at least one of a punched feature and a pressed feature.

7. The busbar system of claim 1, wherein the first busbar and the second busbar are configured to carry electrical current.

8. The busbar system of claim 1, wherein the bent tab extends perpendicular to the second surface.

9. A method for assembling a busbar system, the method comprising:
   aligning a hole of a first busbar and a through-hole of a second busbar, wherein:
      the first busbar comprises a hole and a notch arranged on a first surface, wherein the notch is arranged along an outer edge of the first surface,
      the second busbar is configured to contact the first surface of the first busbar via a second surface of the second busbar, and
      the second busbar comprises the through-hole and a bent tab;
   engaging the bent tab with the notch such that the bent tab extends into the notch to constrain motion of the first busbar relative to the second busbar in a two-dimensional plane at an interface formed by directly and electrically contacting the second surface to the first surface; and
   applying a clamping force between the first surface of the first busbar and the second surface of the second busbar using a fastener that extends into the aligned hole and through-hole.

10. The method of claim 9, wherein the engaging comprises pressing the first busbar and the second busbar together so that the first surface of the first busbar and the second surface of the second busbar are in direct electrical contact with each other.

11. A busbar system comprising:
    a first busbar comprising a hole and a notch arranged on a first surface, wherein the notch is arranged along an outer edge of the first surface;
    a second busbar comprising a through-hole on a second surface and at least one bent tab configured to engage with the notch; and
    a fastener that extends through the through-hole into the hole and applies a clamping force between the first surface and the second surface, wherein:
       when the hole is aligned with the through-hole to allow the fastener to extend therethrough and the first surface is in direct electrical contact with the second surface of the second busbar, the second surface extends along the first surface until the notch is reached where the second surface bends into the notch via the at least one bent tab.

12. The busbar system of claim 11, wherein the notch comprises a pressure feature.

13. The busbar system of claim 11, wherein the notch comprises a hole.

14. The busbar system of claim 11, wherein the at least one bent tab comprises a rectangular protrusion.

15. The busbar system of claim 11, wherein the first busbar and the second busbar are configured to carry electrical current.

16. The busbar system of claim 11, wherein the at least one bent tab is arranged on a side of the through-hole and is a feature of the second surface.

17. The busbar system of claim 11, wherein the notch is comprised of a shape configured to receive the at least one bent tab.

18. The busbar system of claim 11, wherein the at least one bent tab is a first bent tab, the busbar system further comprising:
    a second bent tab arranged on the second surface;
    a recess feature arranged on the first surface;
    wherein the second bent tab is configured to bend into a recess feature when the hole and the through-hole are aligned to allow the fastener to extend therethrough; and
    wherein the recess feature is comprised of a geometry to secure the second bent tab when the second bent tab extends into the recess feature.

* * * * *